(12) United States Patent
Marton et al.

(10) Patent No.: US 8,472,500 B2
(45) Date of Patent: Jun. 25, 2013

(54) JOINT DEMODULATION AND SYNCHRONIZATION IN ULTRA WIDEBAND SYSTEMS

(75) Inventors: Montserrat Najar Marton, Castelldefels (ES); Monica Navarro Rodero, Castelldefels (ES)

(73) Assignee: Fundacio Privada Centre Tecnologic de Telecomunicacions de Catalunya (ES)

( * ) Notice: Subject to any disclaimer, the term of this patent is extended or adjusted under 35 U.S.C. 154(b) by 228 days.

(21) Appl. No.: 13/062,870

(22) PCT Filed: Sep. 26, 2008

(86) PCT No.: PCT/EP2008/062920
§ 371 (c)(1),
(2), (4) Date: Jun. 23, 2011

(87) PCT Pub. No.: WO2010/025780
PCT Pub. Date: Mar. 11, 2010

(65) Prior Publication Data
US 2011/0249703 A1    Oct. 13, 2011

(30) Foreign Application Priority Data
Sep. 8, 2008   (ES) .................. 200802567

(51) Int. Cl.
*H04B 1/69*  (2011.01)
*H04B 1/707*  (2011.01)
*H04B 1/713*  (2011.01)

(52) U.S. Cl.
USPC ........... 375/138; 375/130; 375/260; 375/342; 375/340; 375/369; 370/519; 370/520; 455/59

(58) Field of Classification Search
USPC ................ 375/138, 130, 260, 342, 340, 369, 375/316; 370/519, 520; 455/59
See application file for complete search history.

(56) References Cited

U.S. PATENT DOCUMENTS

| | | | |
|---|---|---|---|
| 8,023,595 B2 * | 9/2011 | Xu et al. ........................ | 375/340 |
| 8,259,829 B2 * | 9/2012 | Rodero et al. ................. | 375/260 |

(Continued)

FOREIGN PATENT DOCUMENTS
WO    2008034466 A1    3/2008

OTHER PUBLICATIONS

Minnie Ho, "A Diffential Detector for an Ultra-wideband Communications System" IEEE, 2002.

(Continued)

*Primary Examiner* — Phuong Phu
(74) *Attorney, Agent, or Firm* — Cantor Colburn LLP

(57) ABSTRACT

A method of demodulating at a receiver a plurality of symbols $b_k$ comprised in a e.g. UWB, received signal y(t), said receiver having knowledge of a time hopping sequence vector c of the transmitted signal, said method comprising the step of: generating a plurality of frequency-domain samples from the received signal y(t). It further comprises the steps of: from said plurality of frequency-domain samples and said time hopping sequence vector c, applying a coarse estimation stage (7) for identifying the beginning of a first complete symbol (formula A) in an acquisition interval; applying a stage for fine estimation (8) of the time delay (formula B) of each symbol $b_k$, wherein k denotes the k-th symbol, by searching a relative maximum at which a signal energy distribution exceeds a certain threshold $P_{th}$; from said fine estimation of the time delay (formula B) of each symbol $b_k$, demodulating (formula C) said symbols $b_k$.

16 Claims, 11 Drawing Sheets

U.S. PATENT DOCUMENTS

2006/0104387 A1* 5/2006 Sahinoglu et al. ............ 375/340
2009/0046792 A1* 2/2009 Xu et al. ........................ 375/260

OTHER PUBLICATIONS

Vincenzo Lottici, "Channel Estimation for Ultra-Wideband Communications" IEEE Journal on Selected Areas in Communications, vol. 20, No. 9, Dec. 2002.

A. Mollfulleda, "Quetzal: Qualified Ultra-wideband Testbed for Reduced Data-Rates and Location" Centre Tecnologic de Telecommunicacions, IEEE 2006.

Montse Najar, "Joint synchronization and demodulation for IR-UWB" Preceedings of the 2008 IEEE International conference on Ultra-wide band (ICUWB2008) vol. 2, IEEE 2008.

Monica Navarro, "Low Complexity Frequency Domain TOA Estimation for IR-UWB Communications", Centre Tecnologoc de Telecommunications de Catalunya, IEEE 2006.

Liuqing Yang; "Timing Ultra-Wideband Signals with Dirty Templates" IEEE Transactions on Communications, vol. 53, No. 11, Nov. 2005.

* cited by examiner

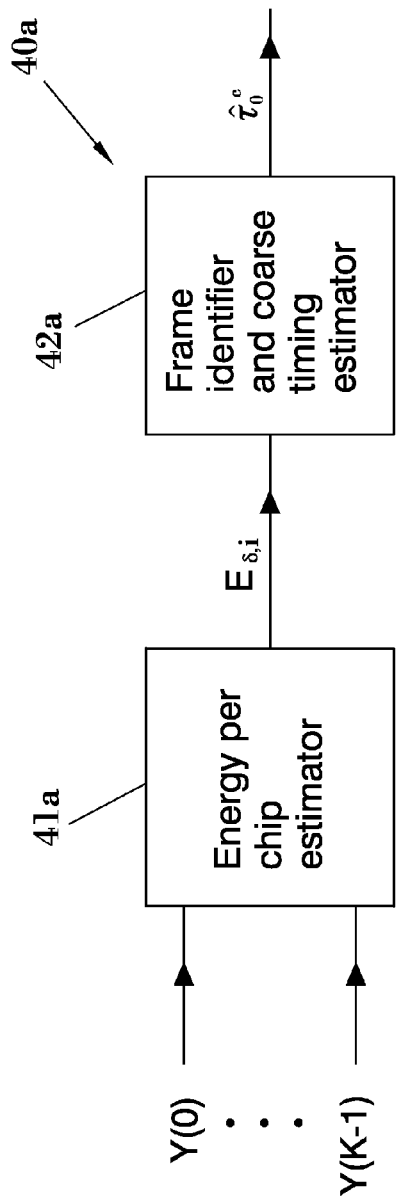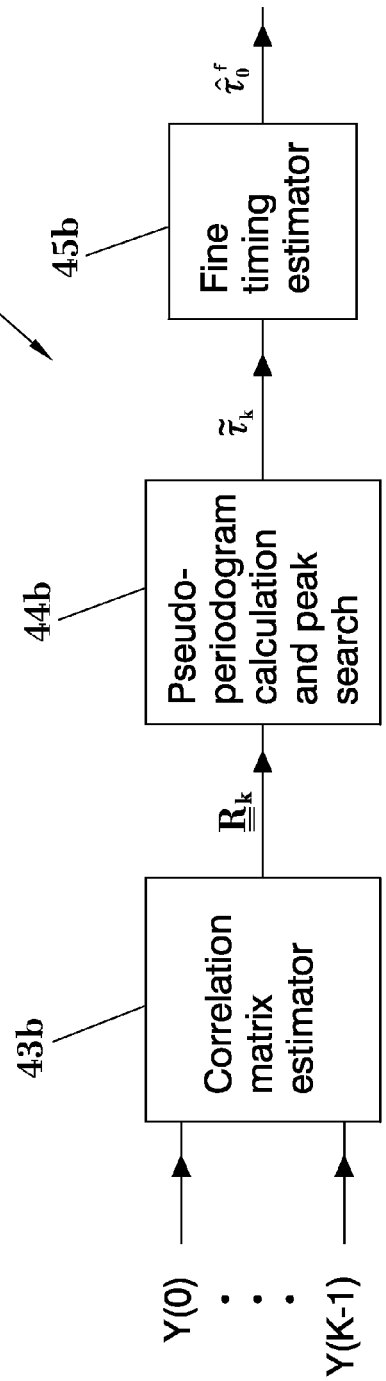
FIG. 6A-1
FIG. 6A-2

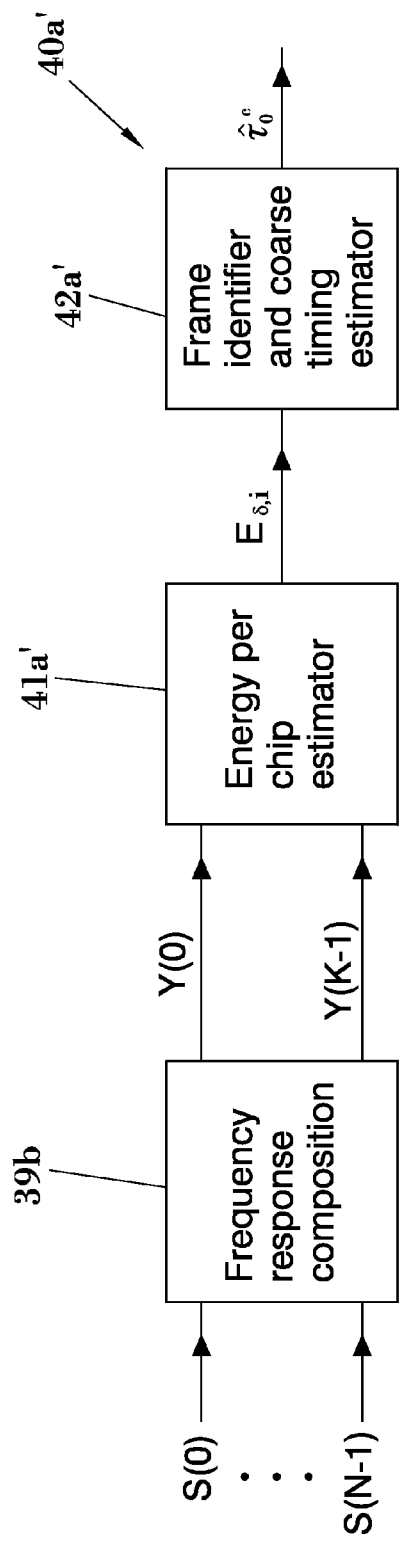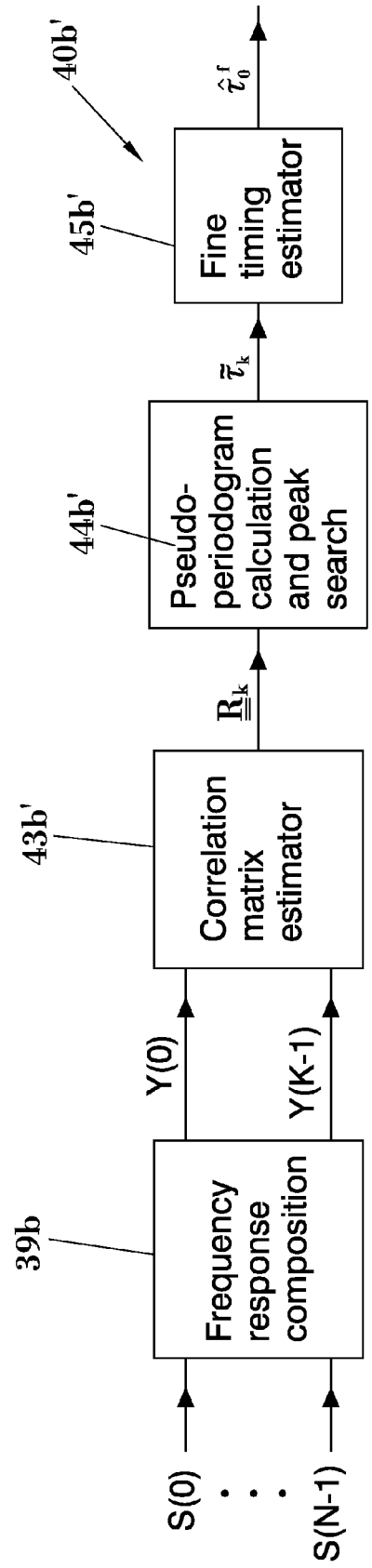
FIG. 6B-1
FIG. 6B-2

JOINT DEMODULATION AND SYNCHRONIZATION IN ULTRA WIDEBAND SYSTEMS

FIELD OF THE INVENTION

The present invention relates to ultra wideband (UWB) systems and, more particularly, to synchronization and demodulation techniques in ultra wideband (UWB) systems.

STATE OF THE ART

UWB communication technology has been motivated by some attractive features: robustness to multipath propagation, low probability of interception, high resolution in location applications, high rate in short range, low power and low complexity. Nevertheless, to take advantage of these features, accurate synchronization and channel estimation are needed, being the two main challenges in UWB systems.

The UWB channel is characterized by being very rich in multipath components. The conventional solution for exploiting multipath diversity in wireless communication channels is provided by the Rake receiver (G. C. M. Z. Win and N. R. Sollenberger, "Performance of rake reception in dense multipath channels: Implications of spreading bandwidth and selection diversity order", *IEEE J. Selected Areas Commun.*, vol. 18, no. 8, pp. 1516-1525, August 2000) which for UWB channels is able to exploit the rich multipath diversity at expenses of high complexity due to the large number of fingers required to capture a significant portion of the signal energy. The estimation of the amplitude and delay of the channel paths requires a very high computational load. Furthermore, timing jitter and imperfect channel estimation considerably degrade the performance of the Rake receiver, as reported by A. D. Vicenzo Lottici and U. Mengali in "Channel estimation for ultra-wideband communications", *IEEE J. Selected Areas Commun.*, vol. 20, no. 9, pp. 1638-1645, December 2003.

Non-coherent receivers that do not require channel estimation have been proposed in the literature. R. T. Hoctor and H. W. Tomlinson, in "Delay-hopped transmitted-reference rf communications", *IEEE International Conference on Ultra-Wideband*, Baltimore, Md., May 2002, pp. 265-269, have proposed a Transmitted Reference (TR) algorithm based on the correlation of the received signal with a reference pulse sent prior to each data pulse. The main drawback of this approach is the energy inefficiency and rate reduction. The Diferential Demodulator (DD) proposed by J. R. F. M. Ho et al. in "A differential detector for an ultra-wideband communications system", *Asilomar Conference on Signals, Systems and Computers*, Birmingham, Ala., pp. 1896-1900, correlates adjacent received information waveforms of differentially encoded symbols, avoiding the energy expense in the reference pulse used in TR schemes. Both approaches, Transmitted Reference and Differential Demodulator, avoid channel estimation but require timing synchronization and yield significant performance degradation when timing is imperfect.

A different, non-coherent demodulator based on dirty templates has been proposed by Y. Lang and G. B. Giannakis in "Timing ultra-wideband signals with dirty templates", *IEEE Trans. Commun.*, vol. 53, no. 11, pp. 1951-1963, November 2005. In this case, both timing and channel are unknown. However, the algorithm needs an initialization phase that assumes the knowledge of the two first symbols, what means that the demodulation can not be performed blindly at any time.

International patent application WO 2008/034466 A1 discloses a method for estimating the time-of-arrival of a received signal for ranging applications. This estimation is carried out in the frequency domain. In WO 2008/034466 A1 no symbol synchronization is carried out.

Recently, several different approaches for UWB timing synchronization have appeared in the literature to solve synchronization. The Maximum Likelihood synchronizer reported by A. D. Vicenzo Lottici and U. Mengali in "Channel estimation for ultra-wideband communications", *IEEE J. Selected Areas Commun.*, vol. 20, no. 9, pp. 1638-1645, December 2003, involves high sampling rate and assumes the knowledge of the received waveform at the receiver. This assumption may not be realistic because the transmitted pulse can be seriously distorted by the antenna and by the channel.

Data Aided (DA) and Non Data Aided (NDA) timing estimation based on dirty templates (Y. Lang and G. B. Giannakis in "Timing ultra-wideband signals with dirty templates", *IEEE Trans. Commun.*, vol. 53, no. 11, pp. 1951-1963, November 2005) do not require waveform knowledge. However, the proposed NDA algorithm requires high number of symbols for an accurate estimation of the time delay even for high signal to noise ratio. Two DA strategies based on Least Squares methods have been presented by C. Carbonelli and U. Mengali, in "Synchronization algorithms for uwb signals", *IEEE Trans. Commun.*, vol. 54, no. 2, pp. 329-338, February 2006, that jointly estimate the channel and the time delay requiring a high rate sampling.

J. L¶opez-Salcedo and G. V¶azquez analyase in "Waveform-independent frame-timing acquisition for uwb signals", *IEEE Trans. Signal Processing*, vol. 55, no. 1, pp. 279-289, January 2007, the timing estimation problem under the unconditional maximum likelihood criterion. This method does not require any prior knowledge of neither the transmitted symbols (NDA) nor the received waveform. The main drawbacks of this proposal are the high complexity and the considerable length of the observation interval required for the acquisition.

SUMMARY OF THE INVENTION

It is therefore an object of the present invention to provide a method of synchronizing and demodulating a signal transmitted through a UWB system which solves the drawbacks of prior art methods. In particular, the method of the invention resolves synchronization and data demodulation blindly, without the need for channel estimation or transmitted training sequence. The method is based on a frequency domain approach, which allows for a sub-Nyquist sampling rate.

In particular, it is an object of the present invention a method of demodulating at a receiver a plurality of symbols comprised in a received signal, said receiver having knowledge of a time hopping sequence vector of the transmitted signal, said method comprising the step of generating a plurality of frequency-domain samples from the received signal. It also comprises the steps of: from said plurality of frequency-domain samples and said time hopping sequence vector, applying a coarse estimation stage for identifying the beginning of a first complete symbol in an acquisition interval; applying a stage for fine estimation of the time delay of each symbol, by searching a relative maximum at which a signal energy distribution exceeds a certain threshold; from said fine estimation of the time delay of each symbol, demodulating said symbols.

Preferably, it further comprising a step of: from said fine estimation of the time delay of each symbol, said coarse estimation and said symbol demodulation, identifying with fine resolution the beginning of a first complete symbol in an acquisition interval. This identification is preferably carried out according to the following expression: $\hat{\tau}_0^f = \hat{\tau}_0^c + \hat{\tau}_k - \hat{b}_k T_\delta - T_\delta$.

Those symbols are preferably modulated according to a pulse position modulated scheme.

In a particular embodiment, the estimation of the beginning of a first complete symbol in said acquisition interval is carried out from at least the pulse position modulation interval and from the identification of a frame order in an acquisition interval. Preferably, this estimation of the beginning of a first complete symbol takes the following expression: $\hat{\tau}_0^c = T_\delta(\alpha_1 - 1 + (N_c - c_\upsilon + (N_f - \upsilon)N_c)N_\delta)$, wherein $\alpha_1$ represents the position of a first value of signal energy, $N_c$ represents the number of chips per frame interval, $c_\upsilon$ represents an element of the time hopping sequence vector c which value indicates the temporal position of the signal within a frame and $N_f$ represents the total number of maximum values of the signal energy equal to the number of frames per symbol.

Preferably, the estimation of said first frame in an acquisition interval $\upsilon$ is obtained as follows: $\upsilon = \arg$ $$\min_{j=1,\ldots,N_f} \|\Delta\alpha - N_f \Delta_{\rho_c}|_j\|^2,$$

wherein $\Delta\alpha = [\alpha_2 - \alpha_1 \ldots \alpha_j - \alpha_{j-1} \ldots \alpha_{N_f} - \alpha_{N_f-1}]$ is a vector indicating the relative distance between said $N_f$ peaks of the estimated maximum energy values, $N_\delta = T_c/T_\delta$ is the number of PPM modulation intervals per chip and $\Delta_{\rho_c}$ is a circulant matrix in which $\rho_c(n)$ denotes the number of chips between two consecutive monocycles:

$$\Delta_{\rho_c} = \begin{bmatrix} \rho_c(1) & \rho_c(2) & \ldots & \rho_c(N_f - 1) & \rho_c(N_f) \\ \rho_c(2) & \rho_c(3) & \ldots & \rho_c(N_f) & \rho_c(1) \\ \vdots & & \ddots & & \vdots \\ \rho_c(N_f) & \rho_c(1) & \ldots & \rho_c(N_f - 2) & \rho_c(N_f - 1) \end{bmatrix}.$$

The energy at each PPM modulation interval is preferably obtained from said plurality of frequency-domain samples as follows: $E_{\delta,i} = \|Y_{\delta,i}\|^2$ for $i = 1, \ldots, N_\delta N_c N_f$, wherein the frequency domain samples of the received signal in the i-th PPM modulation interval $T_\delta$ are defined as:

$$Y_{\delta,i}[n] = \sum_{m=1}^{K_\delta} y[(i-1)K_\delta + m] e^{-j\frac{2\pi}{K_\delta}mn}$$

for $n = 1, \ldots, K_\delta$ wherein $K_\delta = \lfloor T_\delta/T_s \rfloor$, n denotes the frequency samples and m denotes the temporal samples.

In a particular embodiment, said stage of fine estimation of the time delay of each symbol comprises the steps of: estimating a correlation matrix from said plurality of frequency-domain samples and from said estimation of the beginning of a first complete symbol in an acquisition interval; from said correlation matrix, calculating a power delay profile defined as the signal energy distribution with respect to propagation delays; finding a delay value at which said signal energy distribution exceeds a certain threshold, said delay value representing the fine time delay estimation.

Preferably, said step of demodulating said symbols from said fine estimation of the time delay comprises the steps of: defining a differential demodulated symbol as:

$$\hat{a}_k = \begin{cases} 0 & \hat{\tau}_k < T_\delta \\ 1 & T_\delta < \hat{\tau}_k < 2T_\delta \\ 2 & \hat{\tau}_k > 2T_\delta; \end{cases}$$

and demodulating said symbols according to the following expression:

$$\hat{b}_k = \begin{cases} \hat{a}_k & \text{if } \hat{a}_k = 0, 1 \\ \hat{a}_k - 1 & \text{if } \hat{a}_k = 1, 2. \end{cases}$$

The received signal is preferably an ultra-wideband signal and more preferably an impulse radio ultra-wideband signal.

It is another object of the present invention to provide a device for demodulating a plurality of symbols comprised in a signal, said device having knowledge of a time hopping sequence vector of the transmitted signal, said device comprising: means for generating a plurality of frequency-domain samples from the received signal; from said plurality of frequency-domain samples and said time hopping sequence vector, means for applying a coarse estimation stage for identifying the beginning of a first complete symbol in an acquisition interval; means for applying a stage for fine estimation of the time delay of each symbol, by searching a relative maximum at which a signal energy distribution exceeds a certain threshold; from said fine estimation of the time delay of each symbol, means for demodulating said symbols.

The invention also relates to a receiver which comprises at least one device like the previously mentioned. Preferably, said receiver is an impulse radio ultra-wideband receiver.

Finally, it is a further object of the present invention to provide a computer program code means adapted to perform the steps of the method previously mentioned when said program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures:

FIGS. 6A1 and 6A2 show respective coarse and fine estimation schemes according to an embodiment of the present invention.

FIGS. 6B1 and 6B2 show respective coarse and fine estimation schemes according to an embodiment of the present invention.

DETAILED DESCRIPTION OF THE INVENTION

Definitions

Figure 1:
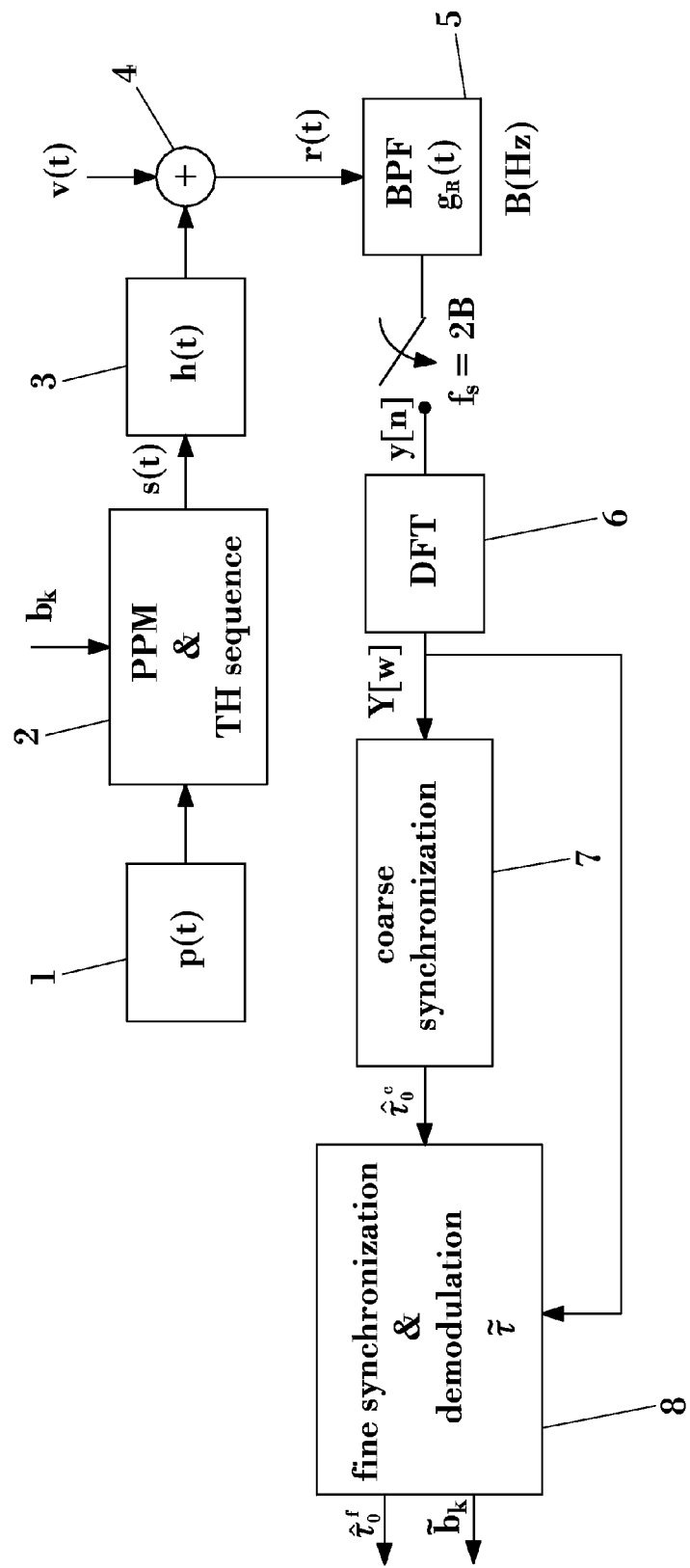
FIG. 1 shows a general block diagram of IR-UWB transmission scheme and a proposed receiver structure according to the invention.

In the context of the present invention, the term "approximately" and terms of its family (such as "approximate", "approximation", etc.) should be understood as indicating values or forms very near to those which accompany the aforementioned term. That is to say, a deviation within reasonable limits from an exact value or form should be accepted, because the expert in the technique will understand that such a deviation from the values or forms indicated is inevitable due to measurement inaccuracies, etc. The same applies to the term "nearly".

Furthermore, the terms "coarse" and "fine" should be understood as follows: "Coarse" refers to a first synchronization stage mainly for identifying the beginning of a symbol. The resolution of this coarse synchronization stage is of the order of the chip duration. In contrast, "fine" refers to a synchronization stage mainly for determining the beginning of a symbol with an expected accuracy of the order of the monocycle pulse duration (typically the chip duration is several order of magnitudes higher than the monocycle pulse duration). It is this second synchronization stage that exploits the high temporal resolution of a UWB signal.

In this text, the term "comprises" and its derivations (such as "comprising", etc.) should not be understood in an excluding sense, that is, these terms should not be interpreted as excluding the possibility that what is described and defined may include further elements, steps, etc.

Signal Model

Although this invention is not limited to the particular structure of impulse radio (IR) ultra wideband (UWB) signals, next a signal model of IR-UWB signals is introduced.

Let's consider an IR-UWB system where transmission of an information symbol is typically implemented by the repetition of $N_f$ pulses of very short duration, typically of about 100 picoseconds. The transmitted signal is expressed as:

$$s(t) = \sum_{k=-\infty}^{\infty} \sum_{j=0}^{N_f-1} a_j p(t - (kN_f + j)T_f - c_j T_c - b_k T_\delta) \quad (1)$$

where Pulse Position Modulation (PPM) is assumed with $\{b_k\}$ being the information symbols taking values $\{0, 1\}$ with equal probability. p(t) refers to the single pulse waveform, being typically a Gaussian monocycle or one of its derivatives of duration $T_p$. $T_{sym}=N_f \times T_f$ is the symbol duration, where $T_f \gg T_p$ is the repetition pulse period also referred to as frame period, and $N_f$ is the number of frames per symbol, $T_c$ is the chip period, $T_\delta$ is the PPM modulation interval, $N_c$ is the number of chips per frame and $\{c_j\}$ is the time hopping sequence which takes integer values in $\{0, 1, \ldots, N_c-1\}$ and $a_j=\pm 1$ denotes a polarization sequence typically used for spectrum shaping. Without loss of generality we assume in the sequel $a_j=1$ $\forall j$.

The channel model considered is given by the general expression for the multipath fading propagation channel as follows:

$$h(t) = \sum_{m=0}^{M-1} h_m \delta(t - \tau_m) \quad (2)$$

With no loss of generality we assume $\tau_0 < \tau_1 < \ldots < \tau_{M-1}$, being $\tau_0$ the TOA (time-of-arrival) that is to be estimated.

The received signal is then the summation of multiple delayed and attenuated replicas of the received pulse waveform $\tilde{p}(t)$ which includes the receive filter:

$$y(t) = \sum_{m=0}^{M-1} \sum_{k=-\infty}^{\infty} \sum_{j=0}^{N_f-1} h_m \tilde{p}(t - (kN_f + j)T_f - c_j T_c - b_k T_\delta - \tau_m) + v(t) \quad (3)$$

We assume the received pulse from each m-th path exhibits the same waveform but experiences a different fading coefficient, $h_m$, and time delay, $\tau_m$. The additive noise v(t) is modelled as zero mean Gaussian circularly symmetric with $N_0$ variance. Given the low duty cycle of UWB signals we assume the received signal is free of intersymbol interference (ISI).

The signal associated to the j-th transmitted pulse corresponding to the k-th symbol, in the frequency domain yields:

$$Y_j^k(w) = \sum_{m=0}^{M-1} h_m S_j^k(w) e^{-jw\tau_m} + V(w) \quad (4)$$

with $$S_j^k(w) = \tilde{P}(w) e^{-jw((kN_f+j)T_f + c_j T_c + b_k T_\delta)} \quad (5)$$

$\tilde{P}(t)=F\{\tilde{p}(t)\}$ and $V(w)=F\{v(t)\}$ denoting by $F\{\}$ the Fourier transform. Sampling (4) at $w_n=w_0 n$ for $n=0, 1, \ldots, N-1$ being $w_0=2\pi/N$ and rearranging the frequency domain samples $Y_j^k[n]$ into the vector $Y_j^k \in C^{N \times 1}$ yields:

$$Y_j^k = S_j^k E_\tau h + V \quad (6)$$

where the matrix $S_j^k$ is a diagonal matrix which components are the frequency samples of $S_j^k(w)$ and the matrix $E_\tau \in C^{N \times N}$ contains the delay-signature vectors (harmonic components) associated to each arriving delayed signal (paths), $$E_\tau = [e_{\tau 0}\ e_{\tau 1}\ \ldots\ e_{\tau j}\ \ldots\ e_{\tau M-1}] \quad (7)$$

with $e_{\tau j} = [1\ e^{-jw_0 \tau_j}\ \ldots\ e^{-jw_0(N-1)\tau_j}]^T$.

The channel fading coefficients are arranged in the vector h $\in R^{M+1}$ and the noise samples in vector V $\in C^{N \times 1}$, wherein R denotes a real value and C denotes a complex value.

The present invention resolves synchronization and data demodulation blindly, without the need for channel estimation or transmitted training sequence. As will be described later, the strategy is based on a first block that performs energy estimation which only requires the knowledge by the receiver of the time-hopping sequence, followed by a low complexity high resolution Time Of Arrival estimation algorithm based on the one disclosed in international patent application WO 2008/034466, that provides fine timing synchronization, from which data demodulation can be achieved.

A general block diagram of IR-UWB transmission scheme and the proposed receiver structure is depicted in FIG. 1. It shows a first block 1 for generating a Gaussian pulse waveform p(t), followed by a second block 2 that builds the train of pulses from a plurality of information symbols $\{b_k\}$. This train of pulses consists of the pulse p(t), repeatedly transmitted at the time instants determined by the TH (time hopping) sequence and the value of the transmitted symbol $\{b_k\}$ according to the PPM modulation. The transmitted signal s(t) is thus built. Next, a block 3 representing the channel is illustrated, followed by an adder 4 intended to add the additive noise v(t). The resulting signal r(t), once filtered at block 5, represents the received signal y(t). In particular, block 5 is a band-pass filter having bandwidth B (Hz). Next, the filtered signal is sampled y[n] at a sampling frequency $f_s = 2B$, after which a Discrete Fourier transform is applied at block 6. The result of this Fourier transform Y[w] is directed to a block for coarse synchronization 7 and to a block for fine synchronization and demodulation 8. The coarse estimation 7 is used also as input of the block for fine estimation and demodulation 8.

For the purpose of describing the joint synchronization and demodulation algorithm, the receiver preferably assumes an ideal Nyquist sampling rate, followed by a DFT module. However, alternatively, there exist implementations that can reduce the high sampling rate requirements associated with UWB signals, by using for instance a filter-bank receiver as reported, for example, by A. Mollfulleda et al. in "QUETZAL: Qualified ultra-wideband testbed for reduced data-rates and location", *Tridencom*, Barcelona, Spain, Mar. 1-3 2006.

Description of the Receiver

Figure 2A:
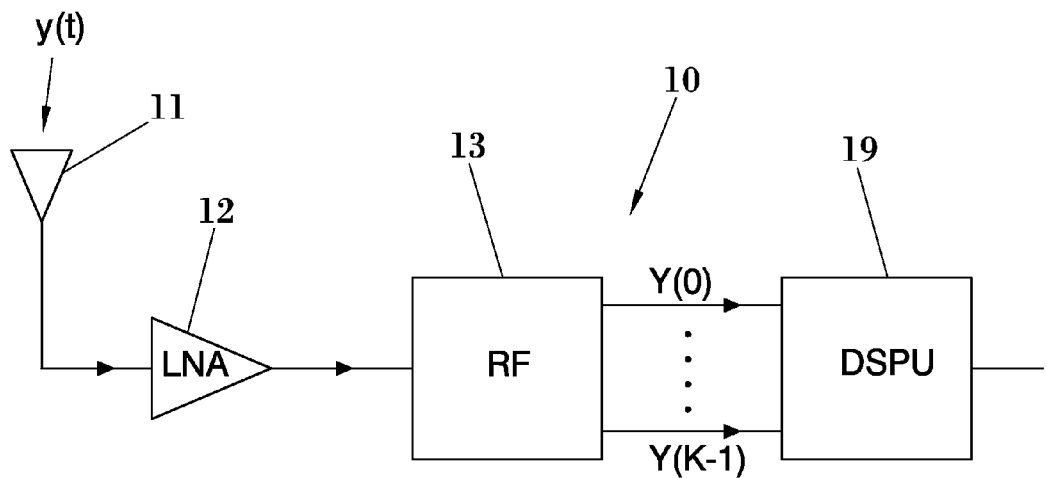
FIG. 2A shows a block diagram of a frequency-domain sampling (FDS) receiver according to an embodiment of the present invention.
Figure 2B:
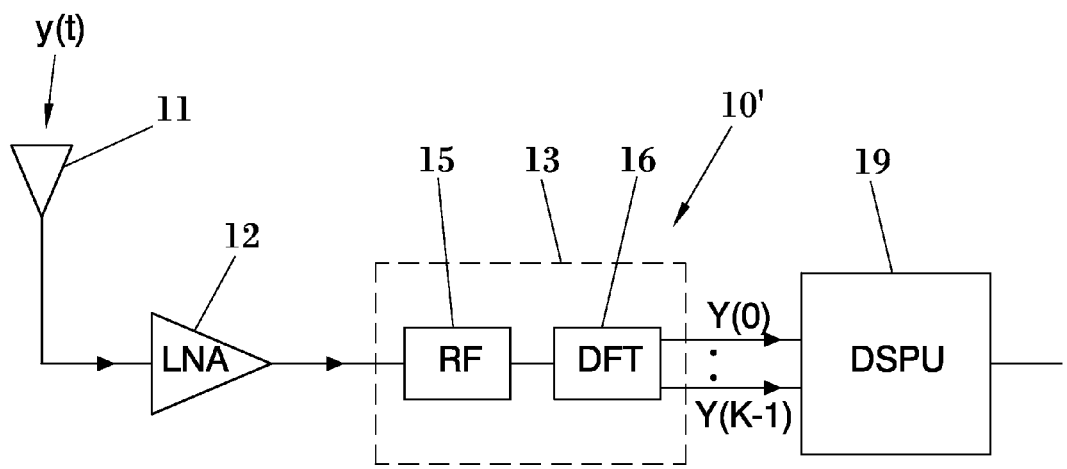
FIG. 2B shows a block diagram of a frequency-domain sampling (FDS) receiver according to an embodiment of the present invention.

FIG. 2-A shows a block diagram of a frequency-domain sampling (FDS) receiver 10 according to the present invention. Receiver 10 comprises a receiving antenna 11 followed by an amplifier, typically a wideband low noise amplifier (LNA) 12. After said amplifier 12, a radio frequency (RF) front-end 13 is located, followed by a digital signal processing unit (DSPU) 19. The radio frequency (RF) front-end 13 provides the digital signal processing unit (DSPU) 19 with a set of samples in the frequency domain (Y(0), Y(1), ..., Y(K-1)).

Since one of the objects of the present invention is a method of synchronizing and demodulating a received signal transmitted through a wireless medium, based on a receiver which provides direct samples of the received signal in the frequency domain, any radio frequency (RF) front-end 13 which is able to provide the digital signal processing unit 19 with a set of samples in the frequency domain (Y(0), Y(1), ..., Y(K-1)) can be used.

If the RF front end provides a signal in the time domain, an intermediate stage performing the Discrete Fourier Transform of such signal is necessary. A block diagram of such a receiver 10' is shown in FIG. 2-B, where reference 15 refers to any RF front-end providing a time domain digital signal and reference 16 refers to a digital block performing the Discrete Fourier Transform.

Figure 3:
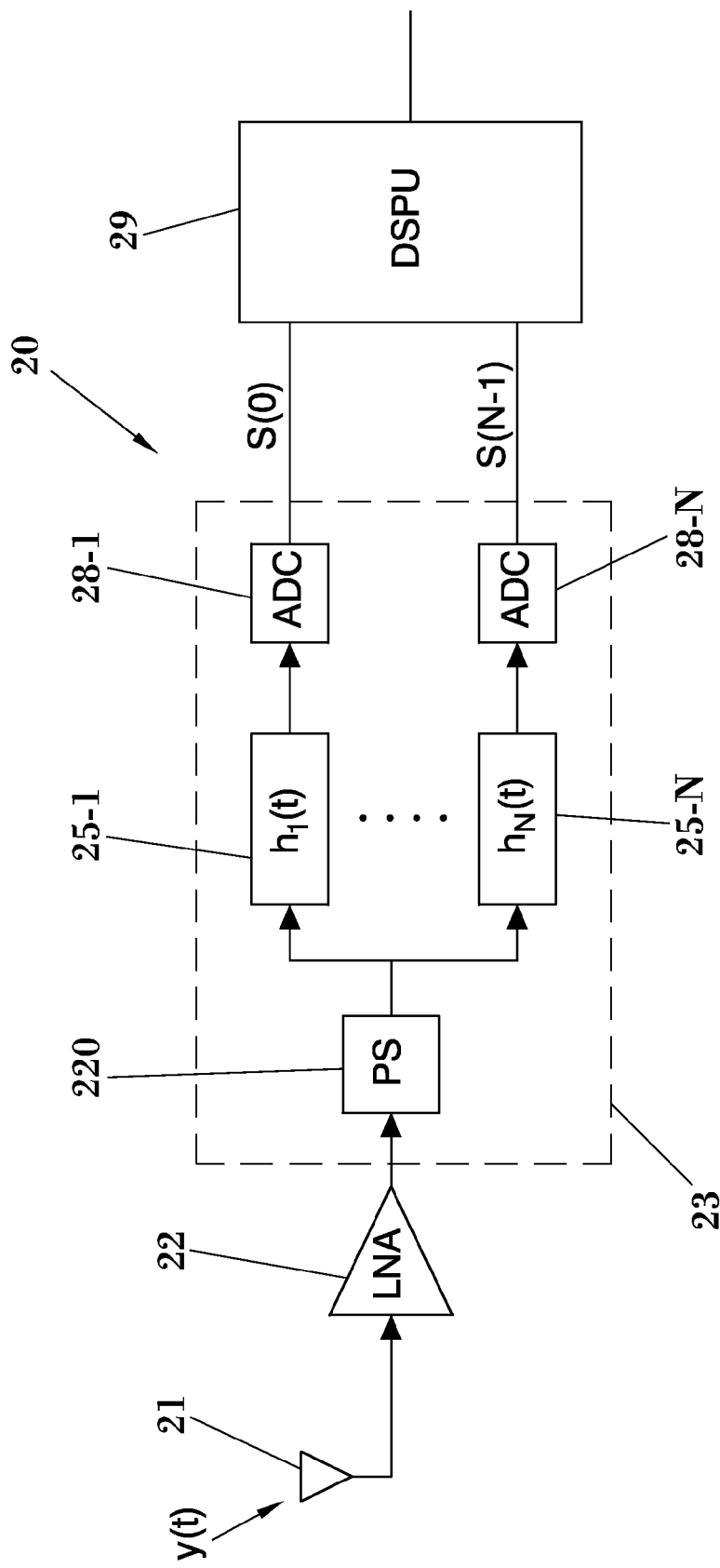
FIG. 3 shows a block diagram of a frequency-domain sampling (FDS) receiver 20 according to a preferred embodiment of the present invention.

FIG. 3 shows a block diagram of a frequency-domain sampling (FDS) receiver 20 according to a preferred embodiment of the present invention. The FDS receiver 20 of FIG. 3 samples, at Nyquist rate, the signal only in the frequency bands of interest. A receiver in the time domain must sample the entire signal at Nyquist rate, which results in a higher overall sampling rate. Therefore, this preferred embodiment requires lower sampling clock frequencies than time-domain sampling (TDS) receivers. Similar to receiver 10 or 10', receiver comprises a receiving antenna 21, an amplifier, typically a wideband low noise amplifier (LNA) 22, followed by a radio frequency (RF) front-end 23 which, in turn, is followed by a digital signal processing unit (DSPU) 29.

In this preferred embodiment of the present invention, the RF front-end 23 comprises a power splitter (PS) 220, a filter bank 25-1, 25-2, . . . , 25-N and an analog-to-digital (ADC) conversion stage 28-1, 28-2, . . . , 28-N. The power splitter 220 splits the received signal into N branches. Each of said branches enters one of the filter bank bandpass filters 25-1, 25-2, . . . , 25-N, which delivers the signal filtered at the corresponding sub-band. As a result, the filter bank decomposes the received signal into N equally spaced, nearly orthogonal frequency bands representing the spectral components of the received signal. The frequency domain decomposition is based in the discrete Short Time Fourier Transform (STFT), which can decompose a signal in an orthogonal basis.

The discrete STFT of a signal x(t) is defined as:

$$STFT(n, m) = \int_{-\infty}^{\infty} x(t) \gamma_{n,m}^*(t) dt$$

where $\gamma_{n,m}(t)$ are the STFT basis functions. Typically, the STFT basis functions consist of a window function translated in both time and frequency. By properly choosing the window function and translation intervals, a set of orthogonal frequency bands can be obtained. In the described receiver implementation, $\gamma_{n,m}(t)$ corresponds to the $n^{th}$ band filter, delayed by m times the sampling period. In order to obtain the STFT coefficients, STFT(n,m), one must sample each filter output at time intervals spaced by m times the sampling period. This operation is performed by the analog-to-digital (ADC) conversion stage 28-1, 28-2, . . . , 28-N, which samples the measured spectral components delivered by the filter bank 25-1, 25-2, . . . , 25-N.

Finally, a digital signal processing unit (DSPU) 29 performs signal detection, synchronization and channel equalization in the frequency domain.

The receiver can be designed with any number of filters in the filter bank 25-1, 25-2, . . . , 25-N, provided that a physical implementation is feasible. The number of filters in the filter bank determines the dimension of the synchronizer and demodulator input vector, since it determines the dimension of vector S, which will be introduced later in this description. In addition, since the signal bandwidth is constant, the number of filters determines the filter bandwidth, which in turn determines the sampling rate of the ADC stages 28-1, 28-2, . . . , 28-N. Nevertheless, the overall sampling rate at which the receiver 20 operates remains constant, since it is given by the sum of the sampling rates of all ADC stages 28-1, 28-2, ..., 28-N.

In a system with a signal bandwidth of W, the frequency spacing Δf between the N filters 25-1, 25-2, ..., 25-N is given by:

$$\Delta f = \frac{W}{N-1}$$

Each filter 25-1, 25-2, ..., 25-N measures one in-band spectral component during an interval of $T_a=1/\Delta f$ (sampling period). The ADC conversion stage 28-1, 28-2, ..., 28-N samples the filter outputs at a rate $F_m=1/T_a$ (sampling frequency) to avoid time-domain aliasing. The observation samples after the ADC conversion operation are the N spectral components of the received signal, which are grouped in a vector $S=[S(0) ... S(N-1)]^T$ of size 1×N, and wherein "T" denotes "transpose matrix". Given the symmetry of the discrete time Fourier transform of signal y(t), an estimated K-length frequency response is formed by appending the observation frequency samples of vector S with themselves in reversed order and zero padding at the extreme and central sampled positions, as follows:

$$Y=[0 ... 0\ S^T\ 0 ... 0\ S'^T\ 0 ... 0]^T$$

where $S'=[S(N-1) ... S(0)]^T$. The minimum number of measured spectral components in the frequency-domain sampling (FDS) approach is given by:

$$N=\lceil W \cdot T_a+1 \rceil$$

As explained before, any radio frequency (RF) front-end 13, 23 which is able to provide the digital signal processing unit 19, 29 with a set of samples in the frequency domain can be used. However, using a RF front-end 23 based on an analog stage which comprises a filter bank 25-1, 25-2, ..., 25-N like the one which has just been proposed (FIG. 2) provides the advantage of incurring in lower complexity of implementation, since the ADC conversion stages 28-1, 28-2 ..., 28-N need a lower sampling frequency. A second advantage of this approach lies on the fact that this RF front-end directly provides the frequency samples which are needed later, without requiring a time to frequency conversion.

Figure 4:
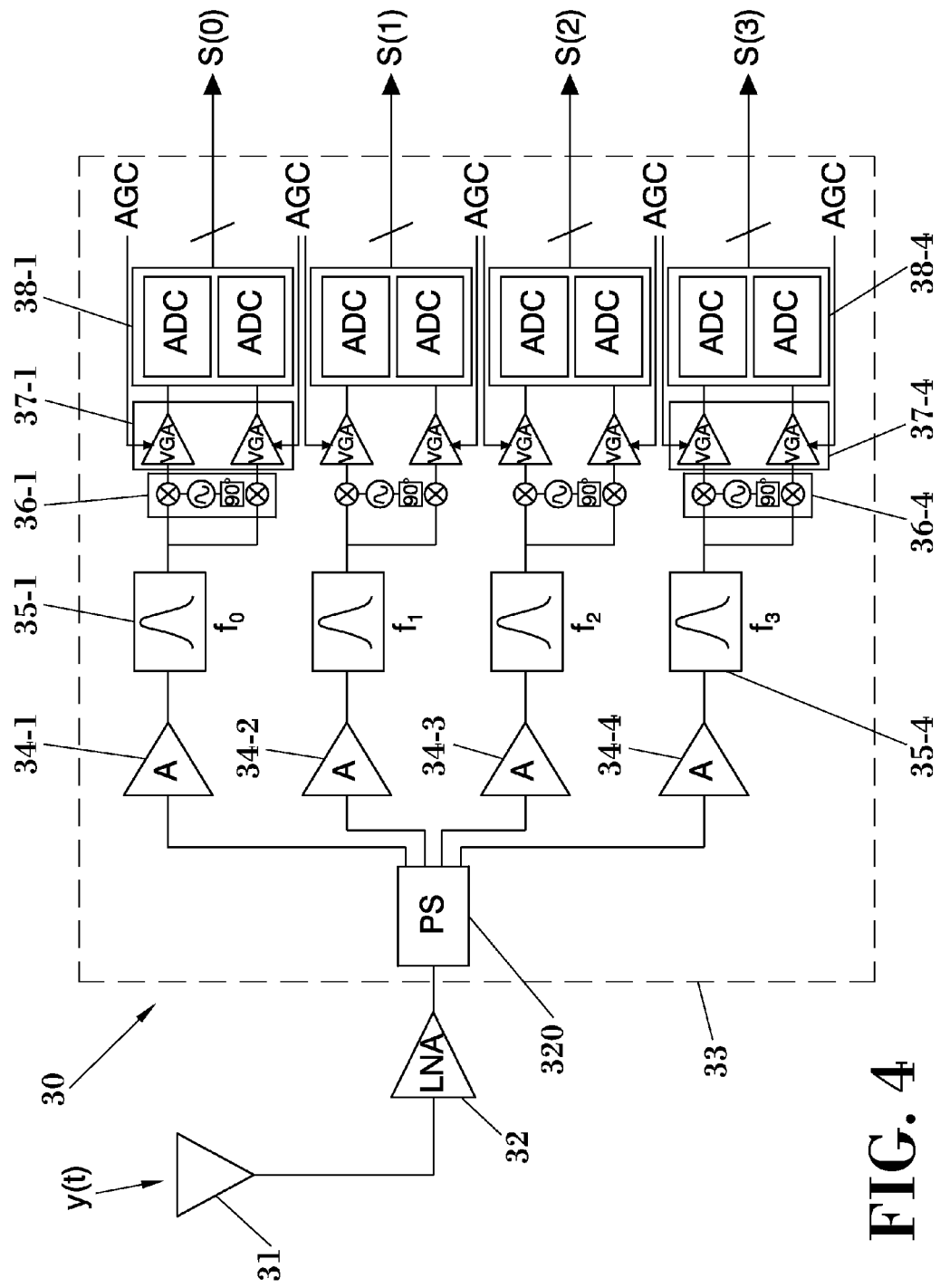
FIG. 4 shows an example of a particular implementation of the receiver according to the preferred embodiment of the present invention.

As a way of example, which must not be considered as a limitation of the present invention, FIG. 4 shows a possible implementation of the receiver 30 according to this preferred embodiment, capable of sampling an impulse radio ultra wideband (IR UWB) signal. The receiver 30 comprises a receiving antenna 31, a wideband low noise amplifier 32 and a RF front-end 33. This RF front-end 33 comprises a power splitter PS 320, a second amplifier stage 34-1, 34-2, ..., 34-4, a bank of band-pass filters 35-1, 35-2, ..., 35-4, a down conversion stage for in-phase and quadrature signals 36-1, 36-2, ..., 36-4, a third amplifier stage 37-1, 37-2, ..., 37-4, which comprises variable gain amplifiers (VGA) with automatic gain control (AGC) input and an analog-to-digital (ADC) conversion stage 38-1, 38-2, ..., 38-4. The digital signal processing unit (DSPU) which follows the ADC conversion stage is not represented in FIG. 4. The receiver 30 can implement a nearly orthogonal, discrete STFT as defined earlier. The discrete STFT coefficients are obtained by periodically sampling the output of each filter. The four bandpass filters shown 35-1, 35-2, ..., 35-4 are designed with a Gaussian-like frequency response, wherein each filter has a bandwidth of approximately 500 MHz approximately centered at the following frequencies $f_0$, $f_1=f_0+1$ GHz, $f_2=f_1+1$ GHz, and $f_3=f_2+1$ GHz. As a result, the basis is nearly orthogonal and does therefore not require phase synchronization of all filters, which is hard to obtain in practice. Also as a way of example, the sampling rate of the ADC conversion stage can be chosen to be 1 Giga-sample per second, i.e. Nyquist rate. The digital signal processing unit (DSPU) processes the 4 channels to reconstruct the received signal and implements the synchronizing and demodulating algorithms, as will be explained later in this description.

Description of the Digital Section of the Receiver

Figure 5A:
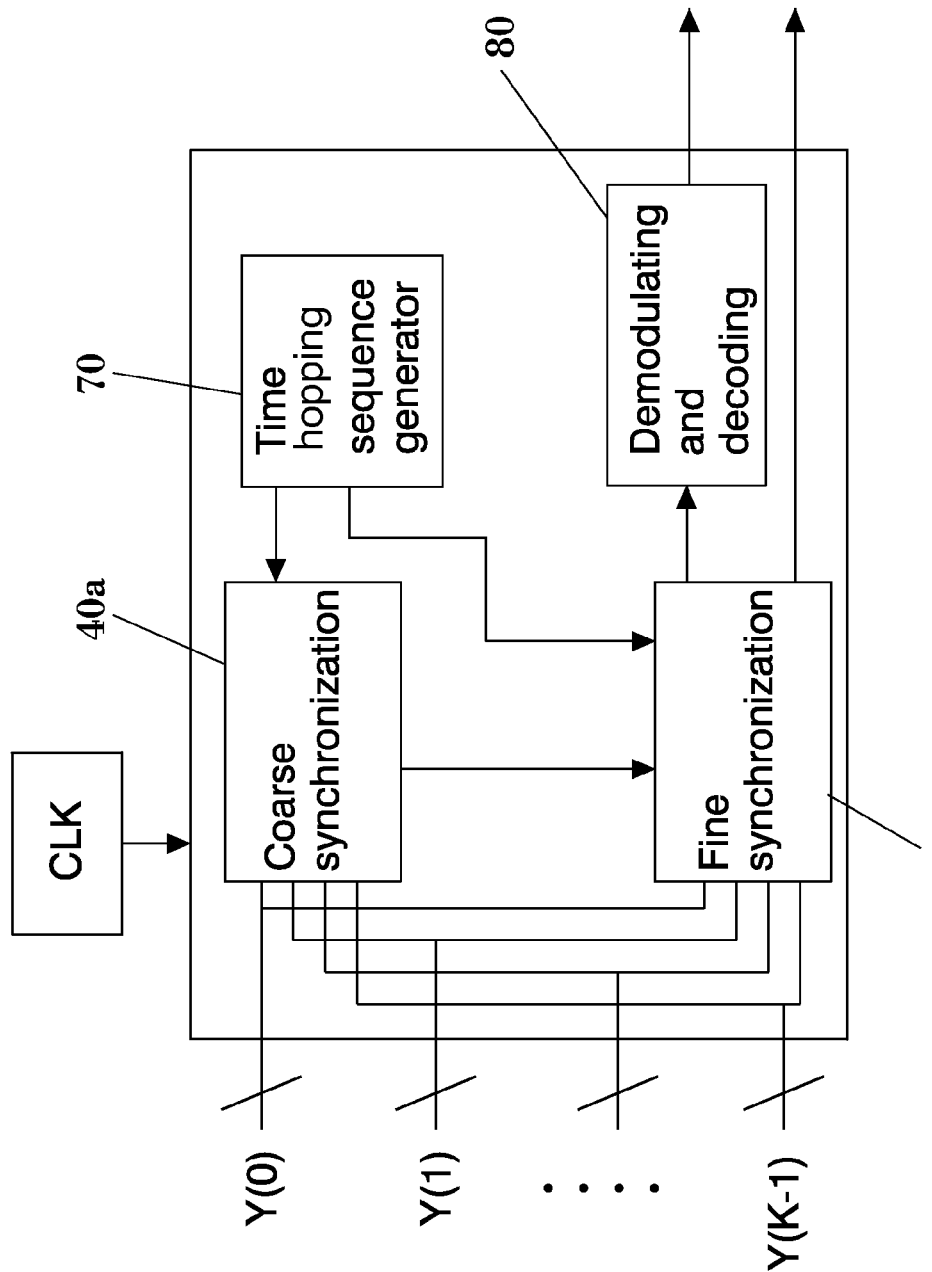
FIG. 5A shows a block diagram of the digital section of a receiver according to an embodiment of the present invention.
Figure 5B:
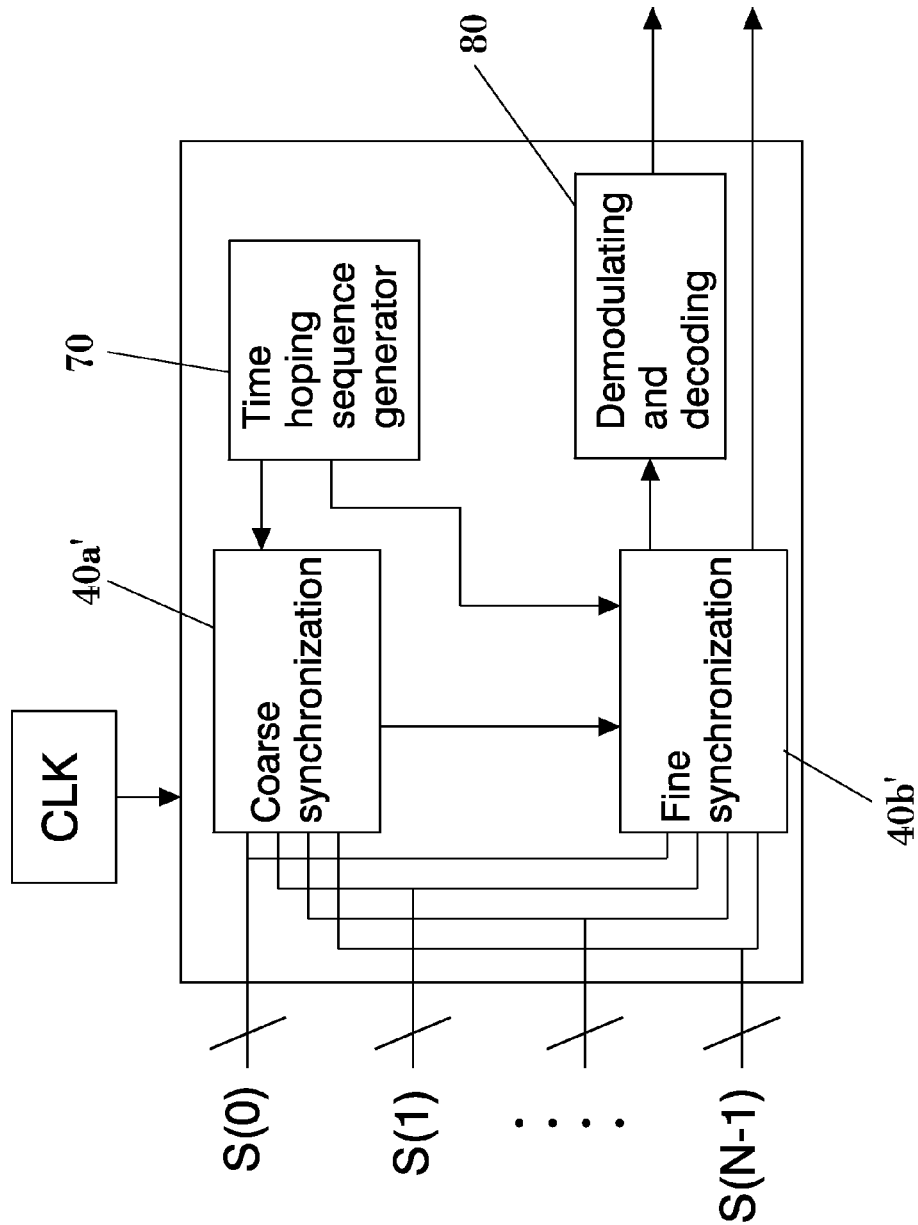
FIG. 5B shows a block diagram of the digital section of a receiver according to an embodiment of the present invention.

FIGS. 5-A and 5-B show a block diagram of a possible implementation of the digital signal processing unit (DSPU) 19, 29 of the receiver 10, 10', 20, 30. The only difference between the DSPU 19 (FIG. 5-A) and the DSPU 29 (FIG. 5-B) is that the first one 19 corresponds to a receiver 10, 10' whose RF front-end 13 provides at its output a set of K samples in the frequency domain (Y(0), Y(1), ..., Y(K-1)), while the second one 29 corresponds to a receiver 20, 30 whose RF front-end 23, 33 provides at its output a set of N samples in the frequency domain (S(0), S(1), ..., S(N-1)), wherein K>2N (see equation (6)). In other words, DSPU 29 (FIG. 5-B) takes advantage of a radio frequency front end 23, 33 which incurs in lower complexity of implementation than the other one 13, as already explained. The DSPU 19, 29 comprises the following functional blocks represented in FIGS. 5-A and 5-B:

means (40a, 40a') for performing a coarse synchronization;

means (40b, 40b') for performing a fine synchronization after a coarse synchronization has been carried out;

a time hopping (TH) sequence generator 70, which obtains the time-hopping sequence used to modulate the transmitted pulses;

means 80 for implementing demodulating and decoding algorithms in order to obtain the information bits from the output of the fine synchronization block 40b.

In the following section, the method of synchronizing and demodulating a received signal y(t) according to the present invention is described in detail.

As already explained, depending on the architecture of the RF front end 13 23 33, a reduced set of samples (S(0), S(1), ..., S(N-1)) is obtained (FIGS. 3, 4) or a complete set of K samples (Y(0),Y(1), ...,Y(K-1)) is obtained.

According to an embodiment of the present invention, represented in FIG. 5-A, a vector Y is directly formed from the K samples delivered from the radio frequency front end 13. As shown in FIG. 5-A, this vector Y is the input of blocks 40a and 40b, which are respectively the blocks responsible for coarse and fine estimation. Block 40a is detailed in FIG. 6-A-1 (blocks 41a, 42a). Block 41a is in charge of calculating the energy per chip interval and outputs $E_{\delta,i}$. In order to identify the frame number to which the first acquired peak corresponds, it is required to know all the $E_{\delta,i}$: i=1, ..., $N_\delta N_c N_f$. Block 42a is in charge of calculating the separation (in number of intervals $T_\delta$) between peaks and compares that separation to each of the rows of the corresponding matrix. Block 40b is detailed in FIG. 6-A-2 (blocks 43b, 44b, 45b).

According to another embodiment of the present invention, in which the radiofrequency front-end 23 33 provides a reduced set of samples (S(0), S(1), ..., S(N-1)) (FIGS. 3, 4), a vector S=[S(0) ... S(N-1)] is the input of blocks 40a' and 40b' (FIG. 5-B). Block 40a' is detailed in FIG. 6-B-1 (blocks 39a, 41a', 42a'), which differs from FIG. 6-A-1 in that a block 39 is needed for creating a vector Y (formed by K elements). Similarly, block 40b' is detailed in FIG. 6-B-2 (blocks 39b, 43b', 44b', 45b'). In a particular embodiment, vector Y comprises 2N+1 elements: The outputs of the N ADC 28-1, . . . , 28-N; 38-1, . . . , 38-N form a vector S=[S(0) . . . S(N-1)]. If a vector S' is created, such as S'=[S(N-1) . . . S(0)], then vector Y: Y=[S 0 S']$^T$ comprises K=2N+1 elements, K being the size of the FFT. By zero padding the size of the DFT can be increased, thereby obtaining a higher value of K.

The vector Y corresponds to the output of block 6 in FIG. 1.

Next, the step of coarse estimation (block 7 in FIG. 1) is described:

The coarse estimation (or coarse synchronization) block 7 (FIG. 1) identifies the beginning of the first complete symbol within the acquisition interval (also called observation interval). The acquisition is the set of samples which are processed at each time instant. Since the present invention does not take into account any previous synchronization, the acquired samples do not start at the beginning of each symbol and therefore it is necessary to identify the beginning of the first complete symbol. This is done by discarding previous samples. Let's define the time hopping sequence vector as $$c=[c_0\ c_1\ \ldots\ c_{N_f-1}]$$

Figure 7:
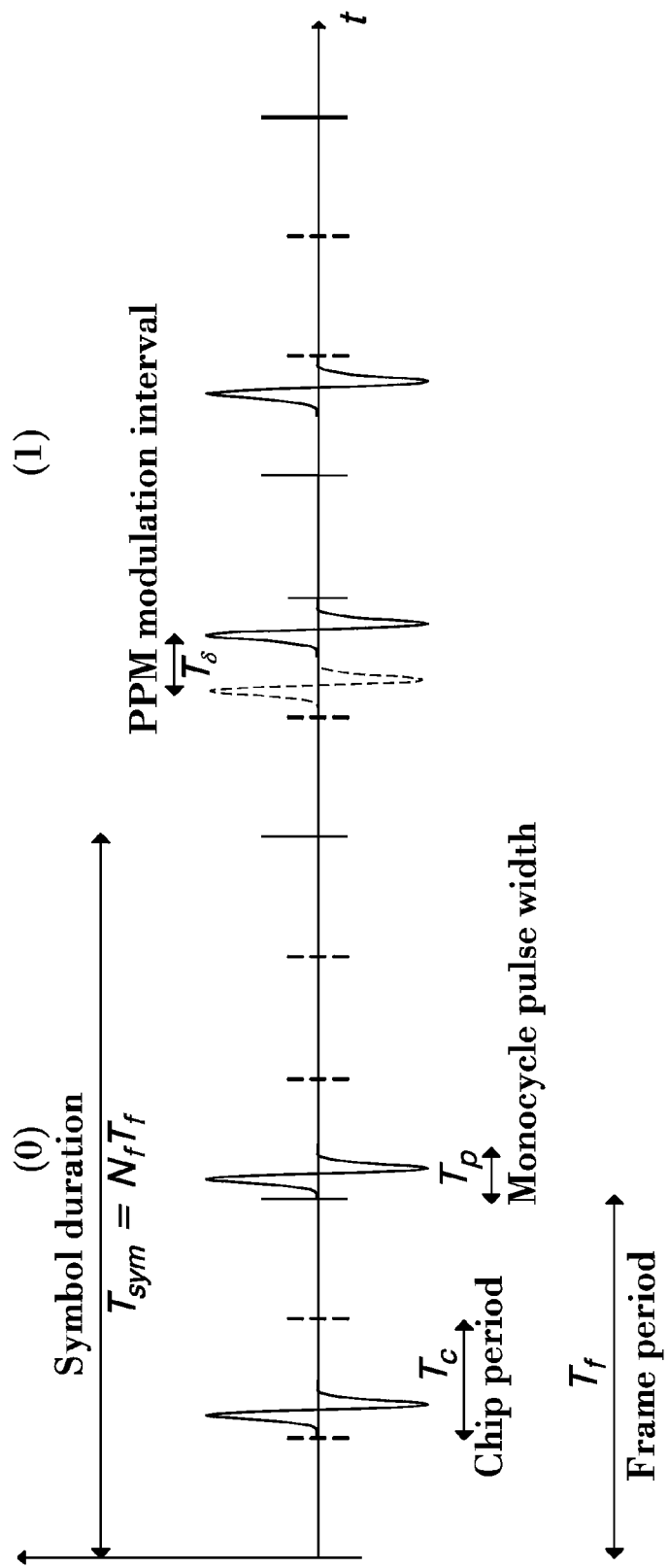
FIG. 7 shows a time representation of the received symbols according to the present invention.

Previous to signal energy estimation, a matrix is defined, which elements are the relative chip delay between monocycles in each frame within one symbol. FIG. 7 shows a time representation of two received symbols "0" "1". In order to facilitate the illustration, the signal parameters take low values. In particular, FIG. 7 shows in solid line the temporal representation of a 2-PPM UWB signal for two consecutive symbols of values '0' and '1', respectively, for $N_f$=2, $N_c$=3 and $T_\delta=T_c/2$. The monocycle pulse drawn in dashed line depicts the relative position of the pulse when data takes '0' value with respect to the transmitted pulse for '1'-valued data. It is emphasized that, for ease of representation, a particular example showing a 2-PPM modulation has been illustrated. However, any higher-order modulation (such as 4-PPM) could be used alternatively. Note that in a 4-PPM modulation, one symbol corresponds to two bits. Let's denote $\rho(n)=N_c-c_{n-1}+c_n$, the number of chips between two consecutive monocycles.

Then, we can define the circulant matrix $\Delta_{\rho c}$ as, $$\Delta_{\rho_c} = \begin{bmatrix} \rho_c(1) & \rho_c(2) & \ldots & \rho_c(N_f-1) & \rho_c(N_f) \\ \rho_c(2) & \rho_c(3) & \ldots & \rho_c(N_f) & \rho_c(1) \\ \vdots & & & \ddots & \vdots \\ \rho_c(N_f) & \rho_c(1) & \ldots & \rho_c(N_f-2) & \rho_c(N_f-1) \end{bmatrix}$$

Figure 8:
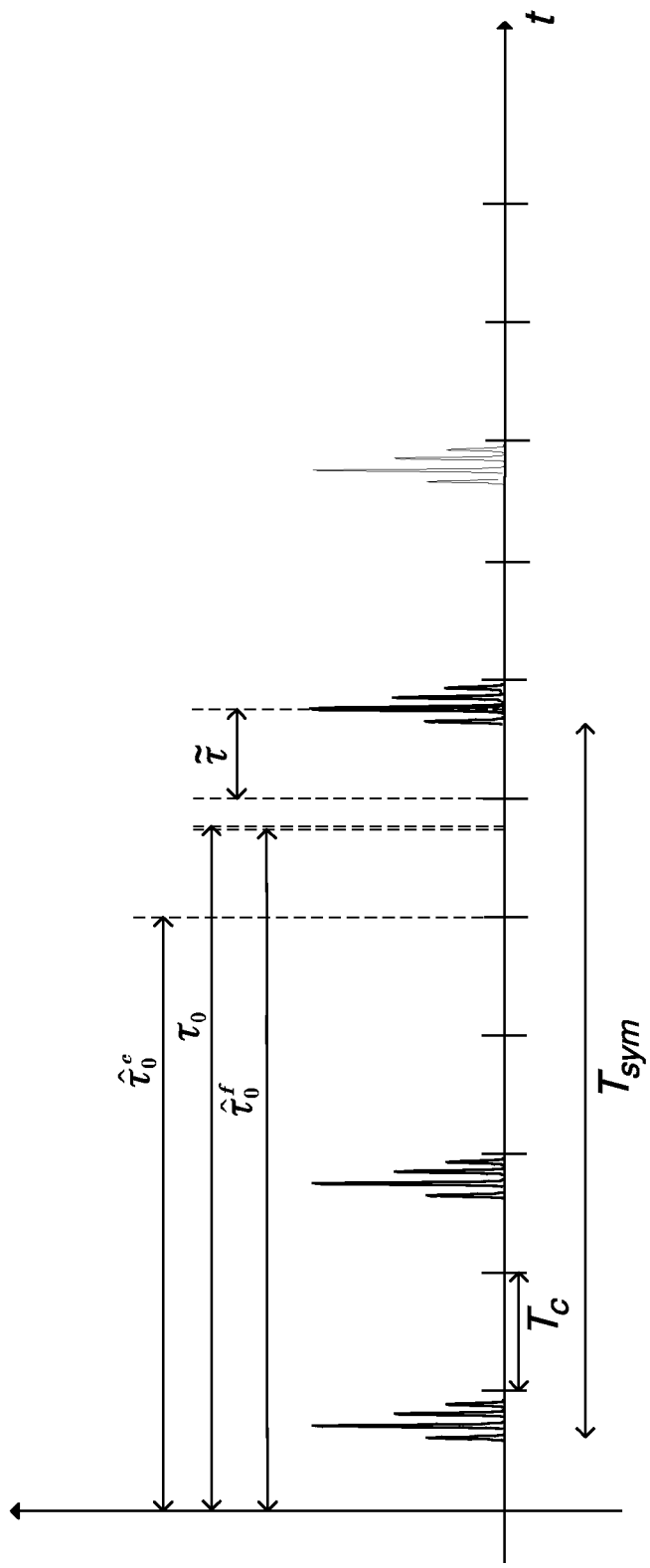
FIG. 8 shows the quantities defining time variables with respect to the beginning of the signal acquisition according to an embodiment of the present invention.

The first frame in the acquisition interval is denoted as $\upsilon$ and $\tau_0$ indicates the beginning of the first complete symbol in the observation interval, being $0 \leq \tau_0 \leq T_{sym}$. This is represented in FIG. 8. In particular, FIG. 8 shows the quantities defining time variables with respect to the beginning of the signal acquisition. The received signal depicted in solid line intends to represent the received multiple delayed and attenuated replicas of each transmitted pulse through a multipath channel. $\tau_0$ is the true time delay that is to be estimated to achieve synchronization. $\hat{\tau}_0^c$ is the coarse estimated time delay that determines the beginning of the first full symbol; $\hat{\tau}$ is the estimated time of arrival of the first path relative to $\hat{\tau}_0^c$ and $\hat{\tau}_0^f$ is the refined estimate of the time delay from the beginning of the acquisition to the beginning of the first full symbol output by the fine synchronization stage. Let's denote $y[m]=y(m\ T_s)$ the discrete-time received signal, where $T_s$ is the sampling period.

The frequency domain samples of the received signal in the i-th PPM modulation $T_\delta$ interval is defined as, $$Y_{\delta,i}[n] = \sum_{m=1}^{K_\delta} y[(i-1)K_\delta + m]e^{-j\frac{2\pi}{K_\delta}mn} \qquad (8)$$

for $n = 1, \ldots, K_\delta$

Rearranging the samples $Y_{\delta,i}[n]$ in the vector $Y_{\delta,i} \in \mathbb{C}^{K_\delta \times 1}$, being $K_\delta = \lfloor T_\delta/T_s \rfloor$, the energy at each PPM modulation interval is obtained as:

$$E_{\delta,i}\|Y_{\delta,i}\|^2 \text{ for } i=1, \ldots, N_\delta N_c N_f \qquad (9)$$

being $N_\delta = T_c/T_\delta$ the number of PPM modulation intervals per chip and $N_c$ the number of chips per frame interval. The algorithm then finds the position of the $N_f$ maximum values of the signal energy, $\alpha=[\alpha_1 \ldots \alpha_{N_f}]$, which correspond to the position of the monocycle pulses in the symbol with a temporal resolution equal to the PPM time shift $T_\delta$. Hence, the relative distance between the $N_f$ peaks of the estimated maximum energy values conforms the following vector, $$\Delta\alpha=[\alpha_2-\alpha_1 \ldots \alpha_j-\alpha_{j-1} \ldots \alpha_{N_f}-\alpha_{N_f-1}]$$

The estimation of the frame number $\upsilon$ which corresponds to the first detected pulse is carried out by finding the closest shifted time-hopping sequence to the estimated $\Delta\alpha$. More specifically, the algorithm finds which j-th row of the circulant matrix $\Delta_{\rho_c}$, denoted as $\Delta_{\rho_c|j}$, minimises:

$$\upsilon = \arg\min_{j=1,\ldots,N_f} \|\Delta\alpha - N_f \Delta_{\rho_c}|_j\|^2 \qquad (10)$$

From the estimated $\upsilon$, the TOA coarse estimation can be identified as:

$$\hat{\tau}_0^c = T_\delta(\alpha_1 - 1 + (N_c - c_\upsilon + (N_f - \upsilon)N_c)N_\delta) \qquad (11)$$

for a 2-PPM modulation with $T_\delta = T_c/2$, $N_\delta = 2$.

As mentioned before, $\tau_0$ indicates the beginning of the first complete symbol in the observation interval (or acquisition interval).

Once the step of coarse estimation (block 7 in FIG. 1) is fulfilled, a further step of fine estimation or fine synchronization (block 8 in FIG. 1) for obtaining synchronization and demodulation is done. This step of fine estimation is described next:

Once the beginning of the symbol is coarsely estimated, joint fine estimation of the time delay and non-coherent blind demodulation is performed, on a symbol by symbol basis.

Figure 9:
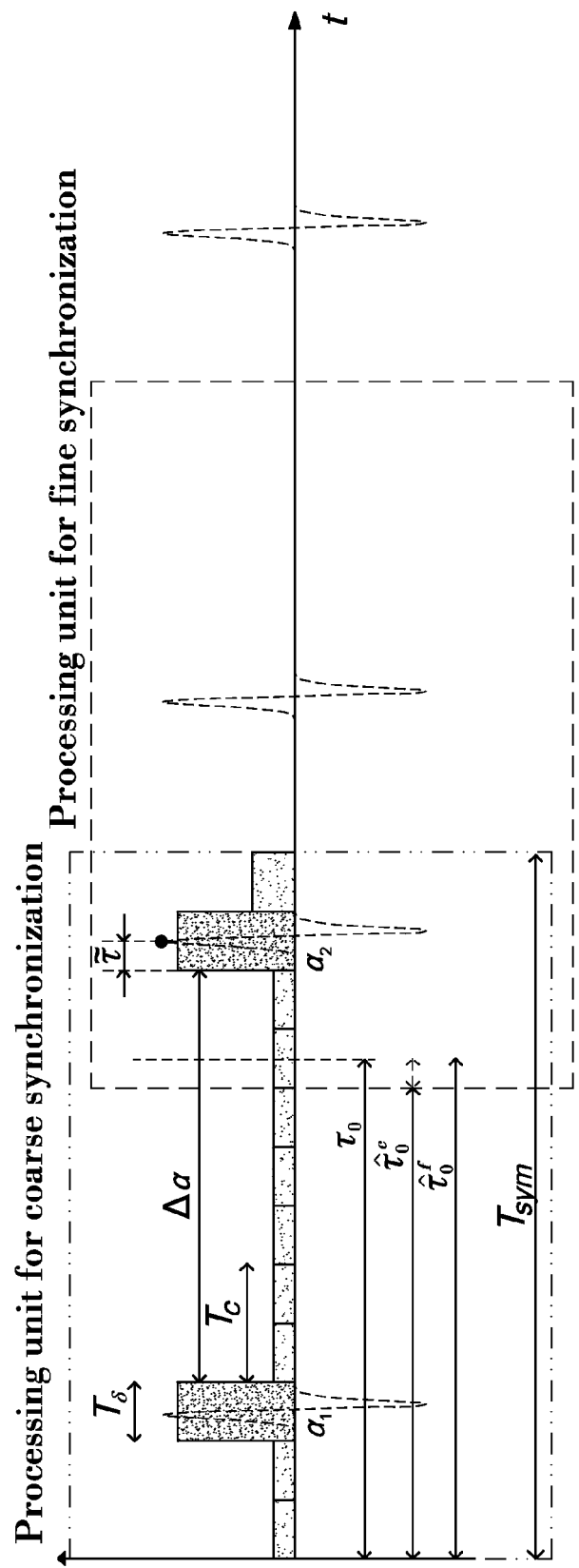
FIG. 9 illustrates the three main steps for achieving final synchronization according to an embodiment of the present invention.

FIG. 9 illustrates in a general way the three main steps for achieving final synchronization: 1) a stage of estimating the energy per chip (this stage is part of the coarse synchronization); a stage of detecting a first path; and 3) the final synchronization. In particular, FIG. 9 shows the energy per chip values computed in the coarse synchronization stage as in (9), which energy values are represented by the rectangles height; the number of PPM modulation intervals between the highest energy values ($\Delta\alpha$) and the estimation of the time delay associated to the first path (solid dot) which leads to signal synchronization by estimating the beginning of the symbol. The temporal position of the ideally received pulses is shown in dashed line.

The fine time delay estimation (also called timing synchronization) and demodulation comprises the following steps:

a) Estimation of the correlation matrix from the frequency domain samples corresponding to the k-th symbol, averaging over the properly arranged frame signals in the symbol:

$$R_k = \frac{1}{N_f} Y_k Y_k^H$$

where matrix $Y_k = [Y_1^k \ldots Y_j^k \ldots Y_{N_f}^k]$ contains column vectors which elements are the DFT samples of the observation signal in a frame period, $$Y_j^k[n] = \sum_{m=1}^{K_f} y[\hat{m}_j^k + m] e^{-j\frac{2\pi}{K_f}nm}$$

for $n = 1, \ldots, K_f$ where $K_f = \lfloor T_f/T_s \rfloor$ is the number of samples in the frame period and $\hat{m}_j^k$ is the first sample associated to the j-th transmitted pulse corresponding to the k-th symbol, $$\hat{m}_j^k = \left\lfloor \frac{\hat{\tau}_0^c - T_\delta - (kN_f + j)T_f - c_j T_c}{T_s} \right\rfloor$$

As can be observed, this estimation of the correlation matrix was already described in WO 2008/034466 A1. The main difference is that in the present invention, the correlation matrix is estimated from the previously done coarse synchronization, represented by $\hat{m}_j^k$.

The PPM modulation time shift $T_\delta$ is subtracted because the beginning of the symbol, $\hat{\tau}_0^c$, has been indistinctly estimated for either $b_k = 0$ or $b_k = 1$.

b) Calculation of the power delay profile defined as the signal energy distribution with respect to propagation delays, from $R_k$. In particular, the power delay profile is obtained by computing the following quadratic form for different values of $\tau$:

$$P_k(\tau) = e_\tau^H R_k e_\tau \quad (12)$$

The so called pseudo-periodogram, $P_k(\tau)$, explained in detail in WO 2008/034466 A1, allows for a low complexity implementation by means of a Fast Fourier Transform (FFT) applied to the following coefficients:

$$\tilde{R}_n = \begin{cases} \sum_{j=n+1}^{N} R_k(j-n, j) & 0 \le n \le N-1 \\ \sum_{j=1}^{N+n} R_k(j-n, j) & -N+1 \le n < 0 \end{cases}$$

where $\tilde{R}_n$ is the sum of the n-th diagonal elements of the correlation matrix $R_k$ and $R_k(i, j)$ denotes the i-th row, j-th column element of $R_k$. Then $P_k(\tau) = \text{FFT}_L\{[\tilde{R}_{-N+1}, \ldots, \tilde{R}_0, \ldots, \tilde{R}_{N-1}]\}$ where $\text{FFT}_L()$ denotes an FFT operation of length L.

c) Estimate the Time Of Arrival (or time delay) $\tilde{\tau}_k$ associated to each symbol $b_k$. In other words, it is estimated the time at which the first pulse associated to a certain symbol $b_k$ is received, with respect to the beginning of the temporal reference. This is done by searching for the first "peak" (a peak is defined as a relative maximum in the power delay profile) value that exceeds a given threshold, $P_{th}$, in the pseudo-periodogram:

$$\tilde{\tau}_k = \min \arg_{96} \{P_k(\tau) > P_{th}\} \quad (13)$$

where $P_{th}$ can be defined as the noise power obtained from the energy calculated in the coarse estimation process.

This estimate of the Time Of Arrival has already been described in WO 2008/034466 A1.

d) Symbol demodulation. The k-th symbol can be jointly synchronized and demodulated directly from the time delay estimate $\tilde{\tau}_k$, without any knowledge of the channel impulse response and without the need of a training data sequence. The procedure is as follows: depending on the value of the first symbol $b_0$, used to estimate the beginning of the symbol $\hat{\tau}_0^c$, the estimated delays take values:

$$b_0 = 0 \rightarrow \begin{cases} b_k = 0 & \tilde{\tau}_k > T_\delta \\ b_k = 1 & \tilde{\tau}_k > 2T_\delta \end{cases}$$

$$b_0 = 1 \rightarrow \begin{cases} b_k = 0 & \tilde{\tau}_k < T_\delta \\ b_k = 1 & \tilde{\tau}_k > T_\delta \end{cases}$$

Thus, it is needed to solve the ambiguity caused by the lack of knowledge of the data value. The proposed algorithm defines a differential demodulated symbol $\hat{a}_k$ as:

$$\hat{a}_k = \begin{cases} 0 & \tilde{\tau}_k < T_\delta \\ 1 & T_\delta < \tilde{\tau}_k < 2T_\delta \\ 2 & \tilde{\tau}_k > 2T_\delta \end{cases}$$

The demodulated symbols are then:

$$\hat{b}_k = \begin{cases} \hat{a}_k & \text{if } \hat{a}_k = 0, 1 \\ \hat{a}_k - 1 & \text{if } \hat{a}_k = 1, 2 \end{cases} \quad (14)$$

The demodulated symbols are thus obtained. Obviously, the invention is not limited to these specific definitions of differential demodulated symbol and demodulated symbol. Rather, other alternatives are possible.

e) Fine synchronization. Fine time delay estimation or synchronization is directly obtained from the application of a direct decision to the demodulated data. More specifically:

$$\hat{\tau}_0^f = \hat{\tau}_0^c + \tilde{\tau}_k - \hat{b}_k T_\delta - T_\delta \quad (15)$$

In summary, the present invention provides a low complexity method for the synchronization and demodulation of a signal transmitted through a wireless system. The method is based on a frequency domain approach, which allows sub-Nyquist sampling rates while achieving high (centimeter, depends on the implementation) ranging accuracy.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of demodulating at a receiver a plurality of symbols $b_k$ comprised in a received signal y(t), said receiver having knowledge of a time hopping sequence vector c of the transmitted signal, said method comprising the step of:

generating a plurality of frequency-domain samples from the received signal y(t);

the method being characterised in that it comprises the steps of:

from said plurality of frequency-domain samples and said time hopping sequence vector c, applying a coarse estimation stage for identifying the beginning of a first complete symbol $\hat{\tau}_0^c$ in an acquisition interval;

applying a stage for fine estimation of the time delay $\tilde{\tau}_k$ of each symbol $b_k$, wherein k denotes the k-th symbol, by searching a relative maximum at which a signal energy distribution exceeds a certain threshold $P_{th}$;

from said fine estimation of the time delay $\tilde{\tau}_k$ of each symbol $b_k$, demodulating $\hat{b}_k$ said symbols $b_k$.

2. The method according to claim 1, further comprising a step of:

from said fine estimation of the time delay $\tilde{\tau}_k$ of each symbol $b_k$, said coarse estimation $\hat{\tau}_0^c$ and said symbol demodulation $\hat{b}_k$, identifying with fine resolution the beginning $\hat{\tau}_0^f$ of a first complete symbol in an acquisition interval.

3. The method according to claim 2, wherein said step of identification with fine resolution $\hat{\tau}_0^f$ is carried out according to the following expression:

$\hat{\tau}_0^f = \hat{\tau}_0^c + \tilde{\tau}_k - \hat{b}_k T_\delta - T_\delta$, wherein $T_\delta$ is the pulse position modulation interval.

4. The method according to claim 1, wherein said symbols are modulated according to a pulse position modulated scheme.

5. The method according to claim 4, wherein said estimation of the beginning of a first complete symbol $\hat{\tau}_0^c$ in said acquisition interval is carried out from at least the pulse position modulation interval $T_\delta$ and from the identification of a frame order in an acquisition interval υ.

6. The method according to claim 5, wherein said estimation of the beginning of a first complete symbol $\hat{\tau}_0^c$ takes the following expression:

$\hat{\tau}_0^c = T_\delta(\alpha_1 - 1 + (N_c - c_\upsilon + (N_f - \upsilon)N_c)N_\delta)$ wherein $\alpha_1$ represents the position of a first value of signal energy, $N_c$ represents the number of chips per frame interval, $c_\upsilon$ represents an element of the time hopping sequence vector c which value indicates the temporal position of the signal within a frame and $N_f$ represents the total number of maximum values of the signal energy equal to the number of frames per symbol.

7. The method according to claim 6, wherein the estimation of said first frame in an acquisition interval υ is obtained as follows:

$$\upsilon = \arg\min_{j=1,\ldots,N_f} \|\Delta\alpha - N_f \Delta_{\rho_c}\|_j\|^2$$

wherein $\Delta\alpha = [\alpha_2 - \alpha_1 \ldots \alpha_j - \alpha_{j-1} \ldots \alpha_{N_f} - \alpha_{N_f-1}]$ is a vector indicating the relative distance between said $N_f$ peaks of the estimated maximum energy values, $N_\delta = T_c/T_\delta$ is the number of PPM modulation intervals per chip and $\Delta_{\rho_c}$ is a circulant matrix in which $\rho_c(n)$ denotes the number of chips between two consecutive monocycles:

$$\Delta_{\rho_c} = \begin{bmatrix} \rho_c(1) & \rho_c(2) & \ldots & \rho_c(N_f - 1) & \rho_c(N_f) \\ \rho_c(2) & \rho_c(3) & \ldots & \rho_c(N_f) & \rho_c(1) \\ \vdots & & \ddots & & \vdots \\ \rho_c(N_f) & \rho_c(1) & \ldots & \rho_c(N_f - 2) & \rho_c(N_f - 1) \end{bmatrix}.$$

8. The method according to claim 7, wherein said energy at each PPM modulation interval is obtained from said plurality of frequency-domain samples as follows:

$E_{\delta,i} = \|Y_{\delta,i}\|^2$ for $i = 1, \ldots, N_\delta N_c N_f$ wherein the frequency domain samples of the received signal in the i-th PPM modulation interval $T_\delta$ are defined as:

$$Y_{\delta,i}[n] = \sum_{m=1}^{K_\delta} y[(i-1)K_\delta + m]e^{-j\frac{2\pi}{K_\delta}mn}$$

for $n = 1, \ldots, K_\delta$ wherein $K_\delta = \lfloor T_\delta / T_s \rfloor$, n denotes the frequency samples and m denotes the temporal samples.

9. The method according to claim 1, wherein said stage of fine estimation of the time delay $\tilde{\tau}_k$ of each symbol $b_k$ comprises the steps of:

estimating a correlation matrix $R_k$ from said plurality of frequency-domain samples and from said estimation of the beginning of a first complete symbol $\hat{\tau}_0^c$ in an acquisition interval;

from said correlation matrix $R_k$, calculating a power delay profile defined as the signal energy distribution with respect to propagation delays;

finding a delay value $\tilde{\tau}_k$ at which said signal energy distribution exceeds a certain threshold $P_{th}$, said delay value representing the fine time delay estimation.

10. The method according to claim 1, wherein said step of demodulating said symbols $b_k$ from said fine estimation of the time delay $\tilde{\tau}_k$ comprises the steps of:

defining a differential demodulated symbol $\hat{\alpha}_k$ as:

$$\hat{a}_k = \begin{cases} 0 & \tilde{\tau}_k < T_\delta \\ 1 & T_\delta < \tilde{\tau}_k < 2T_\delta \\ 2 & \tilde{\tau}_k > 2T_\delta \end{cases}$$

and demodulating said symbols according to the following expression:

$$\hat{b}_k = \begin{cases} \hat{a}_k & \text{if } \hat{a}_k = 0, 1 \\ \hat{a}_k - 1 & \text{if } \hat{a}_k = 1, 2. \end{cases}$$

11. The method according to claim 1, wherein said received signal y(t) is an ultra-wideband signal.

12. The method according to claim 11, wherein said ultra-wideband signal is an impulse radio ultra-wideband signal.

13. A device for demodulating a plurality of symbols $b_k$ comprised in a received signal y(t), said device having knowledge of a time hopping sequence vector c of a transmitted signal, said device comprising:

means for generating a plurality of frequency-domain samples from the received signal y(t);

the device being characterised in that it comprises:

from said plurality of frequency-domain samples and said time hopping sequence vector c, means for applying a coarse estimation stage for identifying the beginning of a first complete symbol $\hat{\tau}_0^c$ in an acquisition interval;

means for applying a stage for fine estimation of the time delay $\tilde{\tau}_k$ of each symbol $b_k$, wherein k denotes the k-th symbol by searching a relative maximum at which a signal energy distribution exceeds a certain threshold $P_{th}$;

from said fine estimation of the time delay $\tilde{\tau}_k$ of each symbol $b_k$, means for demodulating said symbols $b_k$.

14. A receiver which comprises at least a device according to claim 13.

15. A receiver according to claim 14, wherein said receiver is an impulse radio ultra-wideband receiver.

16. A computer program comprising computer program code means adapted to perform the steps of the method according to claim 1 when said program is run on a computer, a digital signal processor, a field-programmable gate array, an application-specific integrated circuit, a micro-processor, a micro-controller, or any other form of programmable hardware.

* * * * *